Patented Dec. 14, 1943

2,336,728

UNITED STATES PATENT OFFICE 2,336,728

TREATMENT OF PAINT FILLERS AND PIGMENTS

Howard W. Hall, Seattle, Wash., assignor to The Dicalite Company, Los Angeles, Calif., a corporation of Nevada No Drawing. Application December 15, 1941, Serial No. 423,074

9 Claims. (Cl. 106—293)

The object of the invention is to decrease the water absorption of certain pigments and fillers used in the manufacture of water paints.

In the manufacture of paints having an aqueous vehicle, such for example as the cold-water casein paints, water absorption is an important and often a controlling factor in selecting a pigment or filler. The Federal specifications covering paints of this type are so generally followed in the trade that paints not conforming to them are not considered to be of the first quality in commerce, and these specifications closely limit the water content.

For example, Federal Standard Stock Catalogue, section IV, part 5 (TT-P-23, December 18, 1935) specifies a maximum water content of 35% in cold water paint pastes, and also specifies minimum percentages of titanium dioxide and zinc sulfid, or of titanium dioxide alone. It further specifices that the paint most dilute with one-half its volume of water (which may contain a small amount of hydrated lime) to a paint of good brushing consistency.

This specification is so drawn as to admit the use of a large quantity (up to 48%+) of inert fillers such as china clay, magnesium silicates, asbestine and diatomaceous earth. Diatomaceous earth is a highly desirable filler in paints of this type, having important advantages over the other fillers named, but its use has been attended by a high water absorption which has, in many cases, made it impossible to meet the specification for maximum water without so increasing the viscosity of the diluted paste that proper brushing properties are lost. This drawback has seriously impeded the use of diatomaceous earth for this purpose.

I have discovered that when a minute proportion of citric acid is added to the grades of diatomaceous earth used for this purpose, the water absorption is reduced to a most surprising degree. For example, the normal water absorption of one well known brand of diatomaceous earth filler is about 220% of its dry weight, but by the addition of $\frac{2}{100}$ of 1% of citric acid the water absorption is reduced to about 160% of the weight of the earth. The reason for his behavior is not known to me, but I have noted that while the pH value of the diatomaceous earth filler is usually from 8.5 to 9.0, the dose of citric acid which gives the lowest water absorption is that which brings the pH of the earth to substantially 7.0. This dose may range from 0.01% to 0.05% of the weight of the earth.

The acid may be mixed with the earth in advance, but it is equally desirable and sometimes more convenient to add the acid to a suspension of the filler in the aqueous vehicle. For example, in a paint having the following formula

| | Pounds |
|---|---|
| Vehicle (a 20% casein solution) | 125 |
| Lithopone | 160 |
| Diatomaceous earth filler | 50 |
| Asbestine | 20 |
| Water | 24 |
| Oil (for emulsifying) | 8 | it is desirable first to blend the diatomaceous earth with the vehicle, producing a thickly viscous suspension, then stir in solution of citric acid until the viscosity has been reduced to a minimum—a point which is readily observable after a little experiment—and then add the other ingredients of the paint in any preferred order. This procedure avoids bringing the paste to an unworkable consistency at any time, which might happen if the earth and acid were added after the lithopone had been worked into the vehicle.

While I have not experimented with all of the acids which might be used for this purpose, I have found that tartaric acid and oxalic acid do not give these desirable results and, so far as I am now aware, the property of materially reducing the water absorbing characteristic of pigments and fillers is unique to citric acid.

In applying citric acid to other fillers and to paint pigments, variable results are obtained. With china clay there is no reduction in water absorption while with the fillers having an alkaline reaction, such as the magnesium silicates, there is an appreciable reduction in water absorption but less than in the case of diatomaceous earth. The treatment produces no result with the various lead pigments but is moderately effective with zinc sulfid and is still more effective with titanium dioxide, and particularly with either of these pigments when intermixed, in the process of manufacture or otherwise, with even a small proportion of diatomaceous earth. In all cases in which the treatment is effective the filler or pigment is normally on the alkaline side of the pH scale and the most effective dose is that which brings the pH value to approximately 7.0.

I claim as my invention:

1. In the manufacture of paints having an aqueous vehicle: the step of incorporating in said paint a diatomaceous earth filler together with sufficient citric acid to bring the pH value of said earth filler to approximately 7.0.

2. In the manufacture of paints having an aqueous vehicle: the step of incorporating in said paint a diatomaceous earth filler together with citric acid in quantity ranging from 0.01% to 0.05% of the dry weight of said filler.

3. In the manufacture of paints having an aqueous vehicle: the step of incorporating in said paint a pigment selected from the group consisting of zinc sulfid and titanium dioxide, a diatomaceous earth filler and citric acid in quantity sufficient to bring the pH value of the mixture of pigment and filler to approximately 7.0.

4. A composition of matter: diatomaceous earth comminuted to a fineness adapting it to use as a paint filler plus a quantity of citric acid sufficient to bring the pH value of said filler to approximately 7.0.

5. A composition of matter: diatomaceous earth comminuted to a fineness adapting it to use as a paint filler plus citric acid in quantity ranging from 0.01% to 0.05% of the dry weight of said filler.

6. A composition of matter: diatomaceous earth comminuted to a fineness adapting it to use as a paint filler, together with a minute quantity of citric acid, the water absorption of the composition being not over 160% by weight.

7. A composition of matter: a pigment selected from the group consisting of zinc sulfid and titanium dioxide; a minor proportion of finely comminuted diatomaceous earth, and sufficient citric acid to bring the pH value of the composition to approximately 7.0.

8. A composition of matter: a zinc sulfid pigment; a minor proportion of finely comminuted diatomaceous earth, and sufficient citric acid to bring the pH value of the composition to approximately 7.0.

9. A composition of matter: a titanium dioxide pigment; a minor proportion of finely comminuted diatomaceous earth, and sufficient citric acid to bring the pH value of the composition to approximately 7.0.

HOWARD W. HALL.